US008954957B2

United States Patent
Wu et al.

(10) Patent No.: US 8,954,957 B2
(45) Date of Patent: Feb. 10, 2015

(54) NETWORK TRAFFIC PROCESSING ACCORDING TO NETWORK TRAFFIC RULE CRITERIA AND TRANSFERRING NETWORK TRAFFIC METADATA IN A NETWORK DEVICE THAT INCLUDES HOSTED VIRTUAL MACHINES

(75) Inventors: David Tze-Si Wu, Fremont, CA (US); Kand Ly, Richmond, CA (US); Lap Nathan Trac, San Francisco, CA (US); Alexei Potashnik, Santa Clara, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 620 days.

(21) Appl. No.: 12/496,430

(22) Filed: Jul. 1, 2009

(65) Prior Publication Data

US 2011/0004876 A1 Jan. 6, 2011

(51) Int. Cl.
*G06F 9/455* (2006.01)
*G06F 15/173* (2006.01)
*H04L 12/46* (2006.01)
*H04L 12/931* (2013.01)

(52) U.S. Cl.
CPC ........ *H04L 12/4625* (2013.01); *G06F 9/45558* (2013.01); *H04L 49/70* (2013.01); *G06F 2009/45595* (2013.01)
USPC ............... 718/1; 709/223; 709/225; 709/239; 370/417

(58) Field of Classification Search
CPC . H04L 12/4625; H04L 49/70; G06F 9/45558; G06F 2009/45595
USPC ........ 718/1; 709/223, 225, 238, 239; 370/417
See application file for complete search history.

(56) References Cited

U.S. PATENT DOCUMENTS 6,798,743 B1 * 9/2004 Ma et al. ........................ 370/235
7,028,333 B2    4/2006 Tuomenoksa et al.
7,177,311 B1 * 2/2007 Hussain et al. ............... 370/392

(Continued)

OTHER PUBLICATIONS

Li et al., VM-based architecture for network monitoring and analysis, 2008, IEEE, The 9th International Conference for Young computer Scientist, pp. 1395-1400.*

(Continued)

*Primary Examiner* — Meng An
*Assistant Examiner* — Abu Ghaffari
(74) *Attorney, Agent, or Firm* — Park, Vaughan, Fleming & Dowler LLP

(57) ABSTRACT

Network devices include hosted virtual machines and virtual machine applications. Hosted virtual machines and their applications implement additional functions and services in network devices. Network devices include data taps for directing network traffic to hosted virtual machines and allowing hosted virtual machines to inject network traffic. Network devices include unidirectional data flow specifications, referred to as hyperswitches. Each hyperswitch is associated with a hosted virtual machine and receives network traffic received by the network device from a single direction. Each hyperswitch processes network traffic according to rules and rule criteria. A hosted virtual machine can be associated with multiple hyperswitches, thereby independently specifying the data flow of network traffic to and from the hosted virtual machine from multiple networks. The network device architecture also enables the communication of additional information between the network device and one or more virtual machine applications using an extended non-standard network protocol.

14 Claims, 9 Drawing Sheets

(56) References Cited

U.S. PATENT DOCUMENTS

| | | |
|---|---|---|
| 7,246,174 B2 | 7/2007 | Sciandra et al. |
| 7,428,598 B2 * | 9/2008 | Arndt et al. ............... 709/250 |
| 7,443,796 B1 | 10/2008 | Albert et al. |
| 7,802,000 B1 * | 9/2010 | Huang et al. ............... 709/228 |
| 7,962,647 B2 * | 6/2011 | Suri et al. .................. 709/238 |
| 8,295,275 B2 * | 10/2012 | Mann ......................... 370/389 |
| 2004/0000106 A1 | 1/2004 | Winarski |
| 2005/0276278 A1 * | 12/2005 | Jung et al. .................. 370/466 |
| 2006/0045089 A1 * | 3/2006 | Bacher et al. ............... 370/392 |
| 2007/0250930 A1 | 10/2007 | Aziz et al. |
| 2008/0005441 A1 | 1/2008 | Droux et al. |
| 2008/0019365 A1 * | 1/2008 | Tripathi et al. ............. 370/392 |
| 2008/0117909 A1 | 5/2008 | Johnson |
| 2008/0271134 A1 | 10/2008 | Johnson |
| 2009/0037682 A1 * | 2/2009 | Armstrong et al. ........... 718/1 |
| 2009/0092137 A1 * | 4/2009 | Haigh et al. ................ 370/392 |
| 2010/0175064 A1 * | 7/2010 | Brahmaroutu ................. 718/1 |
| 2010/0306413 A1 * | 12/2010 | Kamay ....................... 709/247 |

OTHER PUBLICATIONS

Lange et al, Transparent network services via a virtual traffic layer for virtual machines, 2007, HPDC'07, pp. 23-32.*

Niladri Sekhar Nath, "Montego Netoworks Introduces First Virtual Security Switch", "http://ipcommunications.tmcnet.com/topics/ip-communications/articles/23834", Mar. 26, 2008, Publisher: retrieved from TMC.net.

Ruth, Paul et al., "Virtual Distributed Environments in a Shared Infrastructure", May 2005, pp. 63-69, Publisher: IEEE Computer Society.

* cited by examiner

NETWORK TRAFFIC PROCESSING ACCORDING TO NETWORK TRAFFIC RULE CRITERIA AND TRANSFERRING NETWORK TRAFFIC METADATA IN A NETWORK DEVICE THAT INCLUDES HOSTED VIRTUAL MACHINES

CROSS-REFERENCE TO RELATED APPLICATIONS

This application is related to U.S. patent application Ser. No. 12/496,405, entitled "Defining Network Traffic Processing Flows Between Virtual Machines", filed 1 Jul. 2009; U.S. Pat. No. 8,634,437 issued on 24 Jan. 2014, entitled "Extended Network Protocols for Communicating Metadata with Virtual Machines", filed 1 Jul. 2009; and U.S. Pat. No. 8,572,609 issued on 29 Oct. 2013, entitled "Maintaining Virtual Machines in a Network Device", filed 1 Jul. 2009; all of which are incorporated by reference herein for all purposes.

BACKGROUND

The present invention relates network devices in general and in particular to providing virtualized network services and network applications using network devices.

Data communications networks, such as local area networks (LANs) and wide area networks (WANs) often include a variety of network devices for sending, receiving, directing, and optimizing network data traffic. Examples of common network devices include routers, switches, storage-area network front-ends and interfaces, network-address translation (NAT) and firewall devices, and wireless network devices such as access points, bridges, and repeaters. More specialized network devices include standalone print-servers, streaming video and music servers, logging and network management devices, and network monitoring and traffic inspection devices.

WAN accelerators are another example of a network device. WAN accelerators optimize network traffic to improve network performance in reading and/or writing data over a network. WAN accelerators are referred to in the art by many different terms, including, but not limited to, transaction accelerators, WAN optimizers, WAN optimization controllers (WOCs), wide-area data services (WDS) appliances, WAN traffic optimizers (WTOs), and protocol accelerators or optimizers. Additionally, techniques for optimizing network traffic to improve network performance in reading and/or writing data over a network are referred to in the art by many different terms, including, but not limited to, WAN acceleration, transaction acceleration, transaction pipelining, protocol pipelining, request prediction, application flow acceleration, and protocol acceleration. Herein, the term "WAN accelerator" is used to refer to such devices and "WAN acceleration" is used to refer to such techniques.

Most network devices provide a fixed or limited set of functionality. For example, a switch device redirects network traffic. In another example, a WAN accelerator optimizes network traffic passing through a WAN between two or more LANs. Although the fixed or limited set of network device functionality eases the installation and enhances the reliability of network devices, there is an unmet need to enhance network devices with additional functions or applications without compromising reliability and ease of management. Furthermore, there is an unmet need to flexibly direct network traffic to one or more additional functions or network applications provided by a network device. Additionally, there is an unmet need to communicate additional data associated with network traffic to one or more additional functions or network applications provided by a network device.

BRIEF DESCRIPTION OF THE DRAWINGS

The invention will be described with reference to the drawings, in which.

SUMMARY

Figure 1:
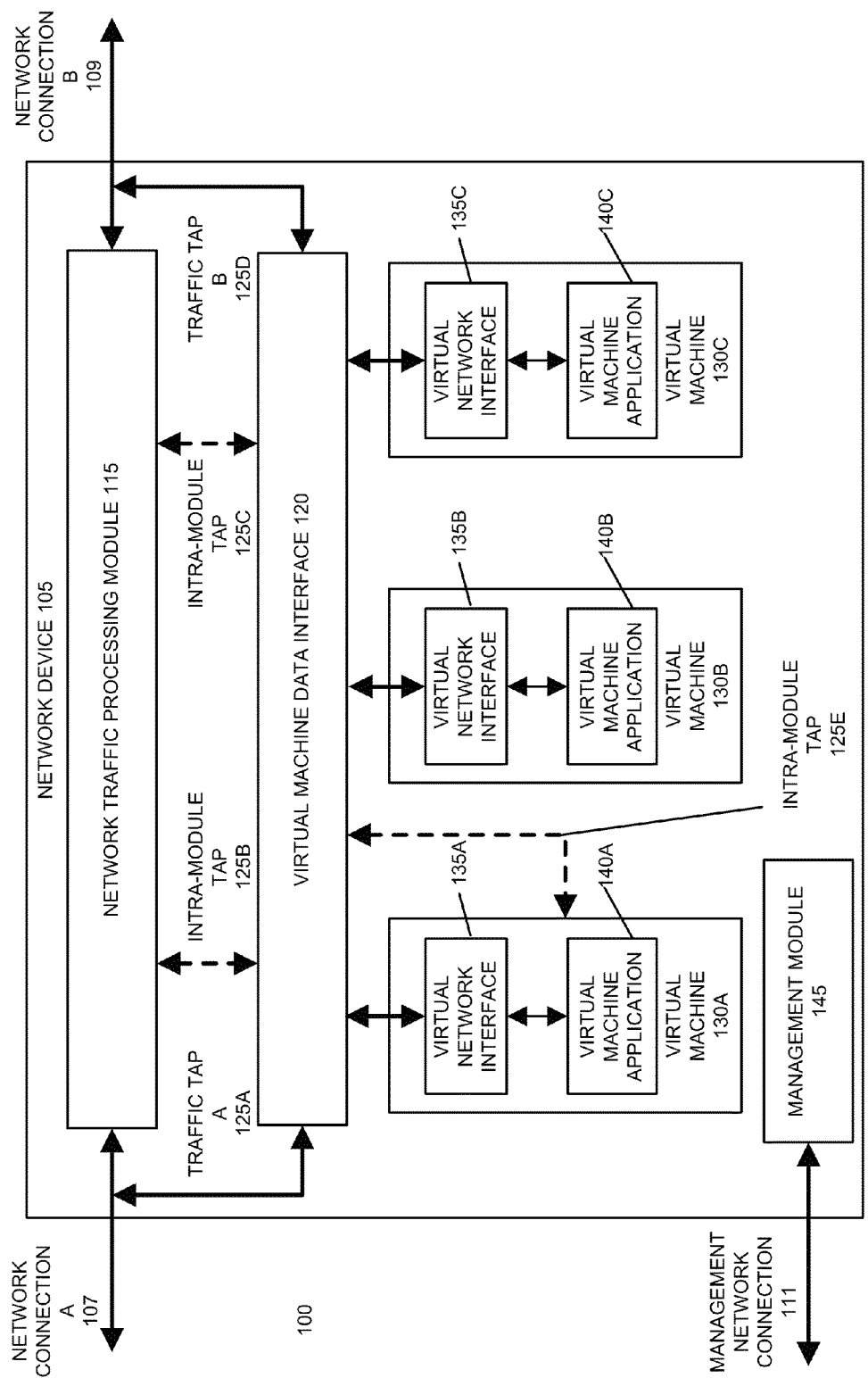
FIG. 1 illustrates a network device architecture including multiple data taps for hosting virtual machines according to an embodiment of the invention.

An embodiment of the invention includes network devices capable of hosting one or more virtual machines and associated virtual machine applications. The use of hosted virtual machines and their applications allows network devices to flexibly and reliably implement additional functions and services. To flexibly direct network traffic within the network device, an embodiment of the network device architecture includes multiple data taps for directing network traffic to hosted virtual machines and allowing hosted virtual machines to inject network traffic.

To specify data transfer topologies between virtual machines and network traffic taps, an embodiment of the network device architecture includes unidirectional data flow specifications, referred to as hyperswitches. Hyperswitches may be implemented as software and/or hardware within a network device. Each hyperswitch is associated with a hosted virtual machine. Each hyperswitch is adapted to receive network traffic directed in a single direction (i.e. towards or away from a network connected with the network device). Each hyperswitch processes received network traffic according to rules and rule criteria. In an embodiment, example rules include copying network traffic to a hosted virtual machine, redirecting network traffic to a hosted virtual machine, passing network traffic towards its destination unchanged, and dropping network traffic. A hosted virtual machine can be associated with two or more hyperswitches, thereby independently specifying the data flow of network traffic to and from the hosted virtual machine from two or more networks.

In an embodiment, the network device architecture also enables the communication of additional information such as network traffic metadata between the network device and one or more virtual machine applications using an extended non-standard network protocol. The use of extended non-standard network protocols allows virtual machine applications to receive network traffic metadata from other modules of the network device, such as a network traffic processing module, or from other hosted virtual machines and their respective virtual machine applications without using complex inter-application or inter-device communication techniques. Furthermore, extended non-standard network protocols provide functionality similar to application programming interfaces without the need to compile applications against specialized API libraries. Additionally, extended non-standard network protocols allow network traffic metadata to be communicated with associated network traffic without any risk of data corruption to the network traffic. Additionally, virtual machine applications and modules of the network device can exchange network traffic metadata using extended non-standard network protocols without any knowledge of the data transfer topology for communicating network traffic between hosted virtual machines and the network device; this allows for flexibility in configuring virtual machine applications within a network device.

DETAILED DESCRIPTION OF ILLUSTRATIVE EMBODIMENTS

FIG. 1 illustrates an example network device architecture 100 including multiple data taps for hosting virtual machines according to an embodiment of the invention. Network device architecture 100 include network device 105. Examples of network device 105 can include network routers, network switches, and other network traffic directing devices; storage-area network front-ends and interfaces; network-address translation (NAT) and firewall devices; wireless network devices such as access points, bridges, and repeaters; print-servers, and other network service provider devices; one-way or two-way streaming video, audio, video-conferencing, VOIP, and music servers; network logging and network management devices; and network monitoring and traffic inspection devices.

In an embodiment, network device 105 includes at least two network connections, referred to as network connection A 107 and network connection B 109. Network connections A 107 and B 109 are each adapted to communicate with one or more network devices and/or computers. Network connections A 107 and B 109 may be connected with the same network or different networks. In an example of the former, the network connections A 107 and B 109 are both connected with a single local-area network (LAN). In an example of the latter, network connection A 107 is adapted to connect with a LAN, allowing network device 105 to communicate with one or more additional network devices and/or computers connected with the LAN. Example network connection B 109 is adapted to connected with a wide-area network (WAN), such as the Internet, allowing network device 105 to communicate with one or more additional network devices and/or computers connected either directly to the WAN or indirectly to the WAN via one or more additional LANs.

In an embodiment, network device 105 receives network traffic via network connections A 107 and B 109 and performs one or more network processing operations using network traffic processing module 115. As a result of its network processing operations, network device 105 may output network traffic via network connections A 107 and/or B 109. In embodiments of network device 105, the network traffic output by network device 105 may be similar or identical to the received network traffic or may be different than the received network traffic. For example, the network traffic output by network device 105 may be a compressed or optimized version of the received network traffic. In a further embodiment, the network device 105 may output network traffic via network connections A 107 and/or B 109 independent of the receipt of any incoming network traffic.

An embodiment of the network device architecture 100 implements one or more additional functions or applications within one or more virtual machines hosted by the network device 105. By hosting additional functions or applications within one or more virtual machines, network device 105 includes flexible, enhanced functionality without compromising reliability and ease of management.

An embodiment of the network device 105 includes a virtual machine data interface 120. Virtual machine data interface 120 is adapted to directed network traffic to, from, and between one or more virtual machines 130 hosted by the network device and the network connections A 107 and/or B 109. In an embodiment, virtual machine data interface 120 is connected with network connection A 107 via a traffic tap A 125a, which is adapted to direct a copy of all incoming LAN traffic to the virtual machine data interface 120. In an embodiment, the traffic tap A 125a is also adapted to direct network traffic from one or more virtual machines 130 hosted by the network device 105 to network devices and/or computers directly or indirectly connected with the network device 105 via LAN connection 107.

Similarly, in an embodiment, virtual machine data interface 120 is connected with WAN connection 109 via a traffic tap B 125d, which is adapted to direct a copy of all incoming WAN traffic to the virtual machine data interface 120. In an embodiment, the traffic tap B 125d is also adapted to direct network traffic from one or more virtual machines 130 hosted by the network device 105 to network devices and/or computers connected directly or indirectly with the network device 105 via WAN connection 109.

In an embodiment, virtual machine data interface 120 may optionally include one or more additional intra-module network traffic taps, such as intra-module network traffic taps 125b and 125c, adapted to direct copies of all network traffic at one or more intermediate stages of network processing operations to the virtual machine data interface 120. Additionally, network traffic output from one or more virtual machines 130 hosted by the network device 105 may be received by the virtual machine data interface 120 and redirected into the network traffic processing module 115 via one or more of the intra-module network traffic taps, such as intra-module network traffic taps 125b and 125c.

Network device 105 can host one or more virtual machines 130, such as virtual machines 130a, 130b, and 130c. Each one of the virtual machines 130 can operate independently of both any other virtual machines 130 and the network traffic processing module 115. As described above, the virtual machine data interface 120 receives incoming and outgoing network traffic or copies of this network traffic via traffic taps 125. In an embodiment, network traffic directed to the virtual machines 130 are received by virtual network interfaces 135 within each of the virtual machines 130, such as virtual network interface 135a within virtual machine 130a, virtual network interface 135b within virtual machine 130b, virtual network interface 135c within virtual machine 130c. In an embodiment, virtual network interfaces 135 are adapted to send and receive network traffic according to standard high-level or low-level network protocols, such as HTTP, TCP/IP, or Ethernet.

In an embodiment, each of the virtual machines 130 executes one or more virtual machine applications 140, such as virtual machine applications 140a, 140b, and 140c. Virtual machine applications 140 can perform many types of additional functions. Example additional functions include but are not limited to data compression and optimization functions; storage-area network functions; network security functions such as network-address translation, firewall, virus and malware protection, document security and redaction applications, and spam or e-mail filtering functions; network service functions such as print servers, e-mail servers, database servers, VPN and data sharing servers, directory and domain servers, web and other content servers, and streaming video and music servers; logging and network management functions; and network monitoring and traffic inspection functions. In general, a virtual machine application may perform any type of function that is capable of being implemented as an application executed by a virtual machine hosted by a network device. In an embodiment, virtual machine applications 140 send and receive network traffic via their associated virtual network interfaces using standard or non-standard networking protocols. From the perspective of the virtual machine applications 140, the network traffic from the virtual network interfaces appears to be network traffic received directly via a physical LAN or WAN.

In a further embodiment, hosted virtual machines and their associated virtual machine applications may also support one or more intra-module network traffic taps. For example, virtual machine 130a includes an intra-module network traffic tap 125e. Intra-module network traffic tap 125e enables virtual machine 130a and its virtual machine application 140a to export network traffic at an intermediate stage of processing to the virtual machine data interface 120, where it may be accessed by the network traffic processing module 115, other hosted virtual machines 130 and their applications 140, and/or output via the network connections 107 or 109 to one or more networks connected with the network device 105.

Additionally, an embodiment of the network device 105 includes a management module 145 for configuring, managing, and monitoring the functions of the network device 105, including the network traffic processing module 115. Optionally, management module 145 may be used to configure, manage, and monitor one or more of the virtual machines 130 hosted by network device 105. For example, network administrators may use management module 145 to upload virtual machine images, which specify the configuration of virtual machines 130 and its applications, to the network device 105. Additionally, network administrators may use management module 145 to start, stop, or otherwise control one or more hosted virtual machines 130. Furthermore, an embodiment of management module 145 enables network administrators to specify the flow of network traffic between network traffic taps 125 and hosted virtual machines 130, as well as between different hosted virtual machines 130.

As described above, the virtual machine data interface 120 can direct network traffic from the traffic tap A, traffic tap B, and any optional intra-module traffic taps to one or more hosted virtual machines in any order. Additionally, the virtual machine data interface 120 can direct network traffic from each hosted virtual machine to one or more other hosted virtual machines and/or to the network traffic processing module 115 and to other computers and network devices via the traffic tap A, traffic tap B, and any optional intra-module traffic taps.

Figure 2A:
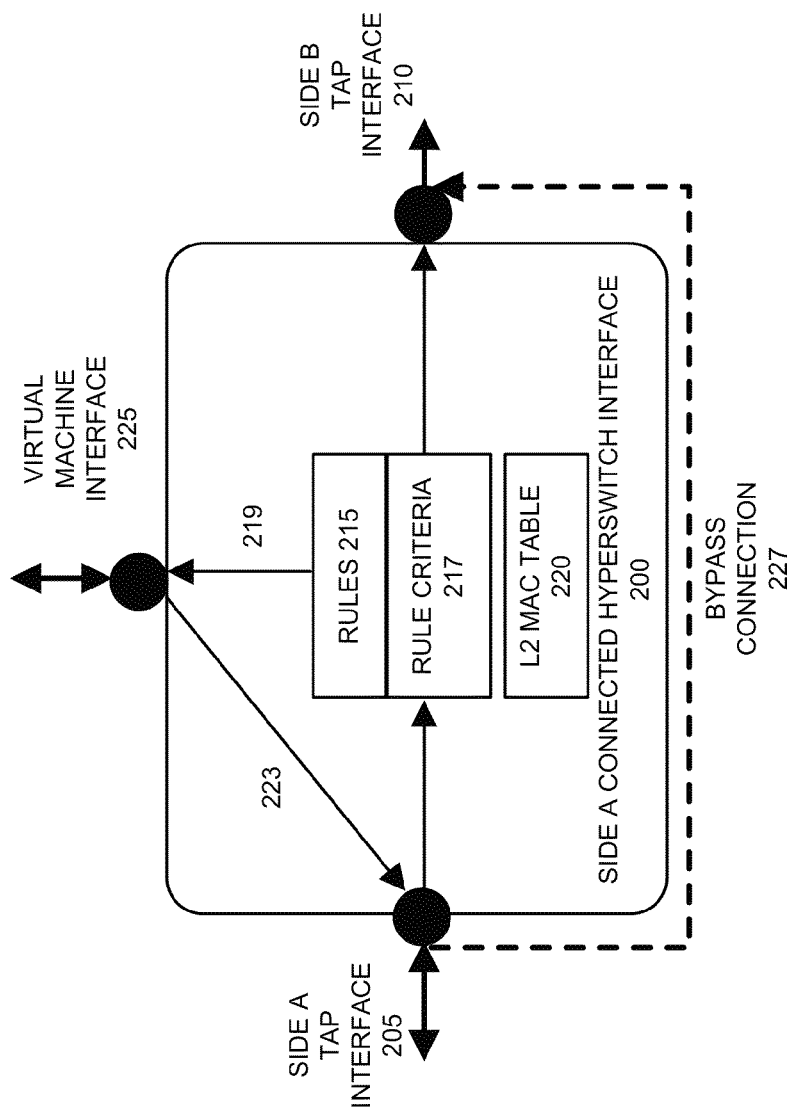
FIGS. 2A-2C illustrates a system for specifying data transfer topologies between virtual machines within a network device according to an embodiment of the invention.
Figure 2B:
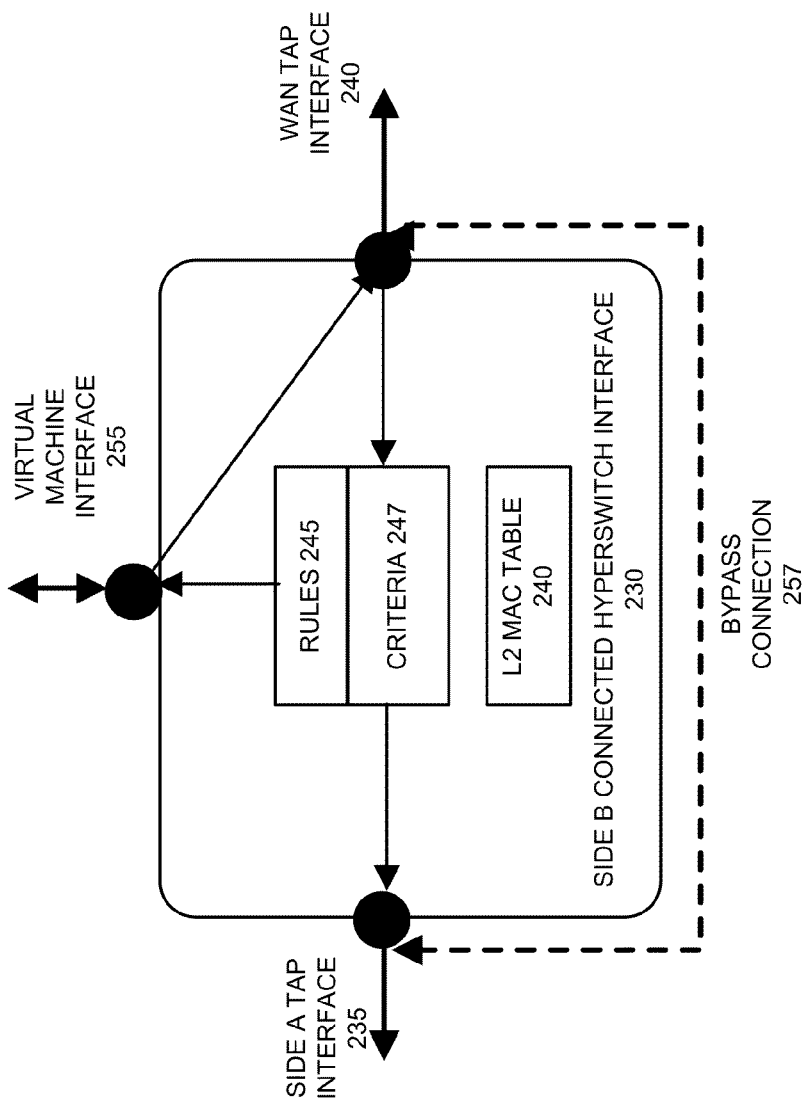
Figure 2C:
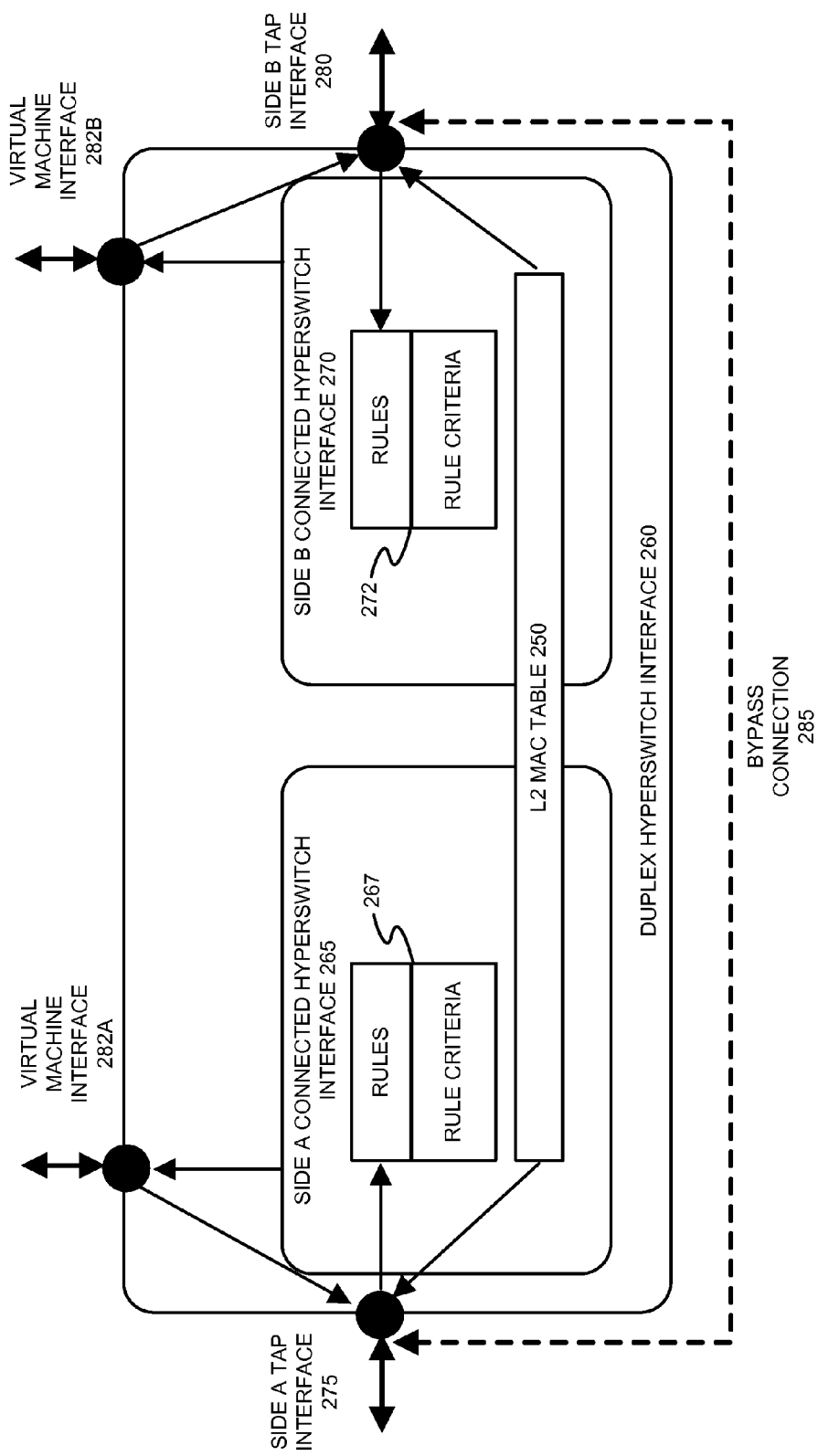

An embodiment of the network device architecture 100 enables the specification of complex data transfer topologies between virtual machines and network traffic taps using one or unidirectional data flow specifications, referred to as hyperswitches. Hyperswitches may be implemented as software and/or hardware within a network device. For example, an embodiment of network device 105 can include one or more software-implemented hyperswitches within the virtual machine data interface 120 to specify the data transfer topology between the one or more connected networks, such as LANs and/or WANs, network traffic processing module, and one or more hosted virtual machines. FIGS. 2A-2C illustrates a system for specifying data transfer topologies between virtual machines using hyperswitches within a network device according to an embodiment of the invention.

FIG. 2A illustrates an example side A connected hyperswitch interface 200. Side A connected hyperswitch interface 200 is adapted for bidirectional data transfer with any network connected with network connection A 107 of a network device 105, such as a LAN or WAN, via side A tap interface 205 and with a hosted virtual machine via a virtual machine interface 225. Side A connected hyperswitch interface 200 is also adapted for unidirectional outbound data transfer with any network connected with network connection B 109 of a network device 105, such as a LAN or WAN, via side B tap interface 210.

Side A connected hyperswitch 200 is adapted to receive network traffic coming to the network device from a first network using the side A tap interface 205. Side A tap interface 205 may receive network traffic received by the network device from the first via any network traffic tap provided by a network device, including traffic tap A 125a, intra-module traffic taps 125b, 125e, and 125c, and traffic tap B 125d shown in example network device architecture 100. Regardless of the traffic tap connected with side A tap interface 205, side A tap interface 205 only receives network traffic received by the network device via the side A network interface 107; as described below, network traffic received by the network device from the same or a different network via the side B network interface 109 is diverted to a separate hyperswitch.

Upon receiving network traffic from the first network via the side A tap interface 205, an embodiment of the side A connected hyperswitch interface 200 applies a set of rules 215 to the received network traffic. In an embodiment, the side A connected hyperswitch interface 200 compares each packet or other unit of network traffic to rule criteria 217 corresponding with the rules 215. Embodiments of the side A connected hyperswitch interface 200 may include one or more attributes of a packet or other unit of network traffic in each of the rule criteria 217, including the packet data contents or payload; layer 2 attributes such as a source or destination MAC address; layer 3 attributes such as a source or destination IP address; layer 4 attributes such as TCP or UDP attributes; layer 5 attributes such as session information; layer 6 and 7 attributes such as those associated with data structures, data presentation, and applications, including application layer protocols such as HTTP (including HTTP URLs) and application data formats such as XML.

In response to a packet or other unit of network traffic matching one or more of the criteria, an embodiment of the side A connected hyperswitch interface 200 applies one or more of the rules 215 corresponding with the matching criteria. In an embodiment, examples of rules 215 may include redirect rules, a copy rule, a pass rule, and/or a drop rule.

A redirect rule diverts network traffic received at the side A tap interface 205 to the hosted virtual machine connected with the virtual machine interface 225. An embodiment of the side A connected hyperswitch interface 200 may use network address translation (NAT) to transfer a received packet directed to an arbitrary IP address to the virtual network interface associated with the hosted virtual machine. In addition to or as an alternative to network address translation-based diversion of network traffic, an embodiment of the side A connected hyperswitch interface 200 may use layer 2 based network switching to redirect received network traffic matching a rule criterion to the hosted virtual machine. In this embodiment, the side A connected hyperswitch interface 200 modifies the destination MAC addresses of the matching received network traffic to the MAC address of the virtual network interface of the hosted virtual machine. One implementation of this embodiment includes a layer 2 routing table 220 for maintaining MAC addresses.

A copy rule mirrors or copies matching network traffic matching at least one of the rule criteria 217. The original network traffic is then forwarded towards its intended destination via the side B tap interface 210. The copy of the matching network traffic is forwarded to the hosted virtual machine connected with the virtual machine interface 225. Embodiments of the side A connected hyperswitch interface 200 may use NAT and/or layer 2 based switching to direct the copy of the network traffic to the hosted virtual machine.

In an embodiment, network traffic copied or diverted to the hosted virtual machine in response to a redirect or copy rule is communicated via connection 219 to the virtual machine interface 225 and on to the hosted virtual machine.

A pass rule forwards the original network traffic towards its intended destination via the side B tap interface 210, without sending the network traffic to the hosted virtual machine. A drop rule discards the network traffic matching the associated rule criteria.

In an embodiment, network traffic subject to rules including the copy rule and the pass rule is output from the side A hyperswitch interface 200 via side B tap interface 210. Side B tap interface 210 directs network traffic towards the side B network interface, optionally passing through one or more additional taps and hyperswitch interfaces. In this manner, network traffic from a first network and entering network device 105 and processed by one or more hyperswitch interfaces is capable of being output by the network device 105 via the side B network interface 109 to either the first network or a different, second network.

In an embodiment, network traffic received by the side A connected hyperswitch interface 200 and directed towards a network device or computer on the first network will be communicated via connection 223 to the side A tap interface 223. This outbound virtual machine network traffic may optionally be processed by one or more additional hyperswitch interfaces and then, if it is not redirected or dropped by one of the hyperswitch interfaces, exits the network device 105 via the side A network connection towards its intended destination.

In an embodiment, the side A connected hyperswitch interface includes a bypass connection 227. In the event that the associated virtual machine or any of its virtual machine applications fails or becomes unresponsive, bypass connection 227 may be activated to allow network traffic to continue to pass through the side A connected hyperswitch interface 200.

FIG. 2B illustrates an example side B connected hyperswitch interface 230. Side B connected hyperswitch interface 230 is adapted for bidirectional data transfer with a network via a side B tap interface 240 and with a hosted virtual machine via a virtual machine interface 255. The side B tap interface receives network traffic originating from the network connected via the side B network connection 109, which may be the same network or a different network than that connected with the side A network connection. Side B connected hyperswitch interface 230 is also adapted for unidirectional outbound data transfer with the side A network connection via a side A tap interface 235.

Side B connected hyperswitch interface 230 is adapted to receive network traffic coming to the network device from the side B network connection using the side B tap interface 240. Side B tap interface 240 may receive network traffic received by the network device from the side B network connection via any network traffic tap provided by a network device, including traffic tap A 125a, intra-module traffic taps 125b, 125e, and 125c, and traffic tap B 125d shown in example network device architecture 100. Regardless of the traffic tap connected with side B tap interface 240, side B tap interface 240 only receives network traffic received by the network device from the side B network interface; as described above, network traffic received by the network device from the side A network connection is handled by a side A connected hyperswitch interface.

Upon receiving network traffic from the side B network connection via the side B tap interface 240, an embodiment of the side B connected hyperswitch interface 230 applies a set of rules 245 to the received network traffic. In an embodiment, the side B connected hyperswitch interface 230 compares each packet or other unit of network traffic to rule criteria 247 corresponding with the rules 245. Embodiments of the side B connected hyperswitch interface 230 may include one or more attributes of a packet or other unit of network traffic in each of the rule criteria 247, including the packet data contents or payload; layer 2 attributes such as a source or destination MAC address; layer 3 attributes such as a source or destination IP address; layer 4 attributes such as TCP or UDP attributes; layer 5 attributes such as session information; layer 6 and 7 attributes such as those associated with data structures, data presentation, and applications, including application layer protocols such as HTTP (including HTTP URLs) and application data formats such as XML.

In response to a packet or other unit of network traffic matching one or more of the criteria, an embodiment of the side B connected hyperswitch interface 230 applies one or more of the rules 245 corresponding with the matching criteria. In an embodiment, examples of rules 245 may include redirect rules, a copy rule, a pass rule, and/or a drop rule. These rules are similar to those described above for the side A connected hyperswitch interface 200, except that network traffic is received via the side B tap interface 240 and output via the side A tap interface 235. Embodiments of the side B connected hyperswitch interface 230 may use NAT or layer 2 switching to direct network traffic or a copy of the network traffic to the hosted virtual machine.

In an embodiment, the side B connected hyperswitch interface 230 includes a bypass connection 257. In the event that the associated virtual machine or any of its virtual machine applications fails or becomes unresponsive, bypass connection 257 may be activated to allow network traffic to continue to pass through the side B connected hyperswitch interface 230.

As described above, each of the side A connected 200 and side B connected 230 hyperswitch interfaces specifies a unidirectional flow of network traffic from one of the network devices' network interface (i.e. the side A network connection or the side B network connection) to a hosted virtual machine. A network device thus includes at least one hyperswitch interface for each of its hosted virtual machines to direct some or all of the network traffic received by one of the network device's network connection to the hosted virtual machines. Additionally, these hyperswitch interfaces can direct network traffic from a hosted virtual machine back to the network connected with the hyperswitch interface.

However, in some situations, a virtual machine application may desire to send and receive network traffic from two or more network connections of the network device. For example, a virtual machine application may desire to receive network traffic coming from a LAN to the network device via a side A network connection and generate outgoing network traffic directed to a WAN connected with the network device via a side B network connection, and vice-versa. In these situations, two or more hyperswitch interfaces may be associated with a hosted virtual machine to provide a duplex or bidirectional specification of data transfer between the LAN, WAN, and the hosted virtual machine.

FIG. 2C illustrates an example duplex hyperswitch interface 260. Duplex hyperswitch interface 260 includes a side A connected hyperswitch interface 265 and a side B connected hyperswitch interface, similar to those described above. In an embodiment, the side A connected hyperswitch interface 265 receives network traffic received by the network device from a first network via side A tap interface 275. This network traffic may be passed via the side B tap interface 280 on to other hyperswitch interfaces (and hence other hosted virtual machines), the network traffic processing module of the network device, and/or the side B connection of the network device. Side A connected hyperswitch interface 265 also selectively copies or redirects network traffic to an associated hosted virtual machine via virtual machine interface 282a, as specified according to rules and rule criteria 267. Network traffic from the hosted virtual machine and directed to the side A network connection passes through virtual machine interface 282a to the side A tap interface 275. In an embodiment, layer 2 MAC table 250 is used to direct network traffic to the side B tap interface 280 or the virtual machine interface 282a.

Similarly, an embodiment of the side B connected hyperswitch interface 270 receives network traffic received by the network device from a side B network connection via side B tap interface 280. This network traffic may be passed via the side A tap interface 275 on to other hyperswitch interfaces (and hence other hosted virtual machines), the network traffic processing module of the network device, and/or the side A network connection of the network device. Side B connected hyperswitch interface 270 also selectively copies or redirects network traffic to the associated hosted virtual machine via virtual machine interface 282b, as specified according to rules and rule criteria 272. Network traffic from the hosted virtual machine and directed to the side B network connection passes through virtual machine interface 282b to the side B tap interface 280. Although FIG. 2C illustrates the virtual machine interface 282 as two separate interfaces 282a and 282b for clarity, embodiments of the duplex hyperswitch interface 260 communicate with its associated hosted virtual machine via a single interface. In an embodiment, layer 2 MAC table 250 is used to direct network traffic to the side A tap interface 275 or the virtual machine interface 282b. In this embodiment, the layer 2 MAC table 250 is shared between the side A connected hyperswitch interface 265 and the side B connected hyperswitch interface 270. Additionally, bypass connection 285 may be activated to allow network traffic to continue to pass through the duplex hyperswitch interface 260 in the event that the associated virtual machine or any of its virtual machine applications fails or becomes unresponsive.

Figure 3:
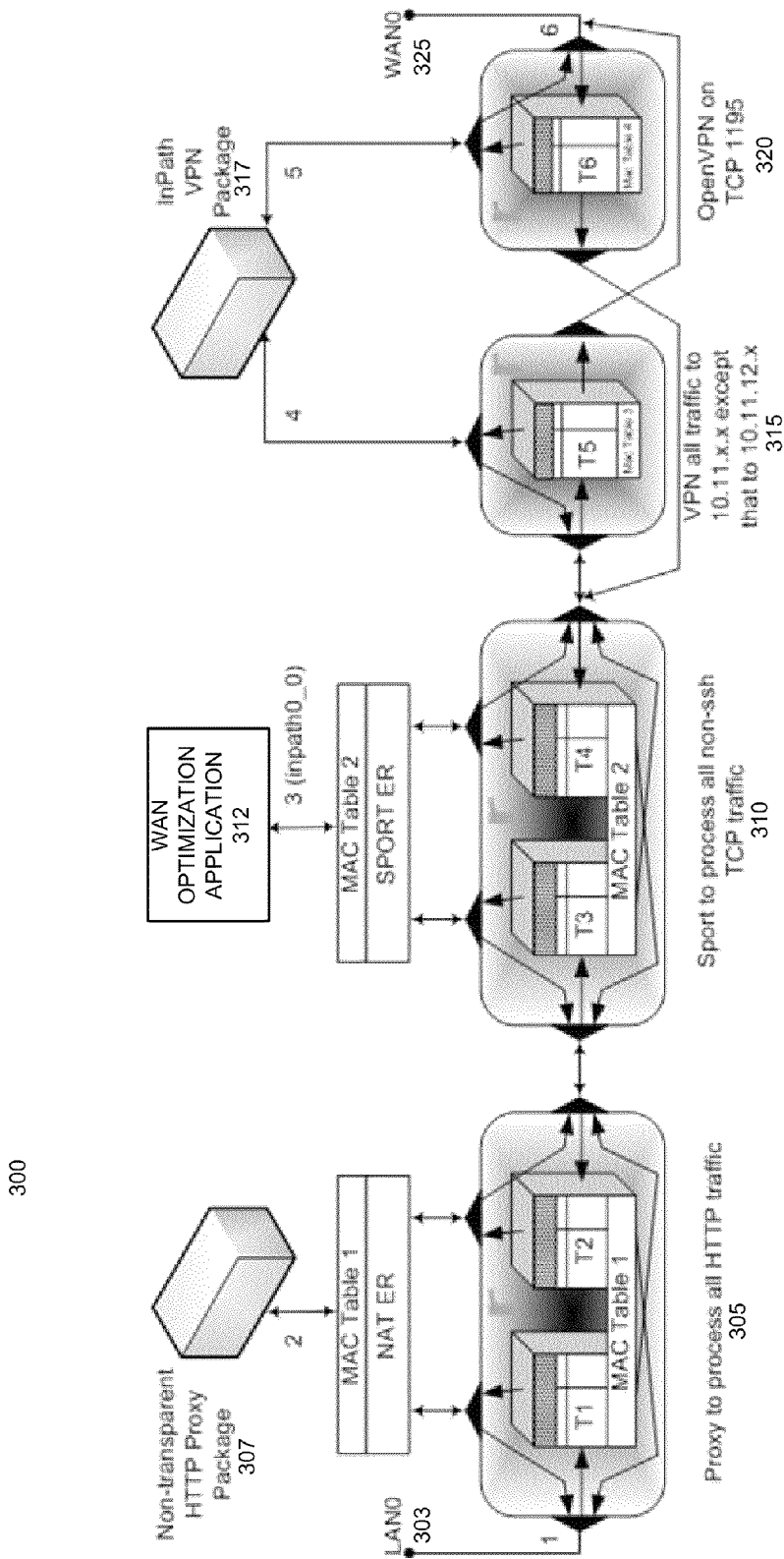
FIG. 3 illustrates an example application of a system for specifying data transfer topologies between virtual machines within a network device according to an embodiment of the invention.

Combinations of two or more side A connected, side B connected, or duplex hyperswitch interfaces may be used to flexibly direct network traffic to one or more hosted virtual machines, thereby enabling the network device to reliably provide additional functions or network applications. FIG. 3 illustrates an example application 300 of hyperswitch interfaces for specifying data transfer topologies between virtual machines within a network device according to an embodiment of the invention.

In example application 300, network traffic received by the network device from a LAN connected to the side A network connection of the network device is provided by side A tap interface 303 to a virtual machine data interface including hyperswitches 305, 310, 315, and 320. Similarly, network traffic received by the network device from a WAN connected to the side B network connection of the network device is provided by the side B tap interface 325 to the virtual machine data interface.

In example application 300, network traffic received by the network device from the LAN via the side A network connection is first processed by duplex hyperswitch 305, which directs HTTP network traffic, using NAT, to a non-transparent HTTP proxy application 307 implemented using a first hosted virtual machine. Non-HTTP network traffic and WAN-directed outbound traffic of the HTTP proxy application 307 is output from duplex hyperswitch 305 to duplex hyperswitch 310. Duplex hyperswitch 310 directs all non-SSH TCP traffic, using layer 2 switching, to a WAN optimization application 312 implemented using a second hosted virtual machine. SSH network traffic and WAN-directed outbound traffic of the WAN optimization application 312 is output from duplex hyperswitch 310 to side A connected hyperswitch interface 315. Side A connected hyperswitch interface 315 directs all network traffic addressed to subnet 10.11.x.x, except for that addressed to subnet 10.11.12.x, to an in-path VPN application 317 implemented by a third hosted virtual machine. WAN-directed outbound network traffic of the VPN application 315, as well as network traffic not matching the specified subnet, is passed to the side B tap interface 325, where it will be optionally processed by the network traffic processing module of the network device and output to the WAN via the side B network connection.

In example application 300, network traffic received by the network device from the WAN via the side B network connection is processed in a similar manner. First, network traffic received by the network device from the WAN is processed by side B connected hyperswitch interface 320, which directs network traffic on TCP port 1195 to the VPN application 317 implemented by the third hosted virtual machine. Network traffic not matching this port or outbound from the VPN application 317 is directed to duplex hyperswitch 310. As with side A network traffic, duplex hyperswitch 310 directs all side B non-SSH TCP network traffic to the WAN optimization application 312 implemented using the second hosted virtual machine. SSH network traffic and LAN-directed outbound traffic of the WAN optimization application 312 is output from duplex hyperswitch 310 to duplex hyperswitch 305. Duplex hyperswitch 305 directs HTTP network traffic to the non-transparent HTTP proxy application 307 implemented using the first hosted virtual machine. Non-HTTP network traffic and LAN-directed outbound traffic of the HTTP proxy application 307 is output from duplex hyperswitch 305 to side A network traffic tap interface 303, where it will be optionally processed by the network traffic processing module of the network device and output to the LAN via the side A network connection.

In an embodiment, virtual machine applications executed in virtual machines hosted by the network device send and receive data via standard network protocols, such as Ethernet, TCP/IP, and/or UDP. However, additional functionality and enhanced performance may be enabled by providing virtual machine applications with additional information not available in standard network protocols. For example, a virtual machine application may benefit from access to network traffic metadata provided by a network traffic processing module of a network device or another virtual machine application executing on a different hosted virtual machine. Network traffic metadata can include any type of additional information describing network traffic, such as an associated application sending or receiving the network traffic or a data type represented by the network traffic.

In an embodiment, a network device architecture enables the communication of additional information such as network traffic metadata between the network device and one or more virtual machine applications using an extended non-standard network protocol. The use of extended non-standard network protocols allows virtual machine applications to receive network traffic metadata from other modules of the network device, such as a network traffic processing module, or from other hosted virtual machines and their respective virtual machine applications without using complex inter-application or inter-device communication techniques. Furthermore, extended non-standard network protocols provide functionality similar to application programming interfaces without the need to compile applications against specialized API libraries. Additionally, extended non-standard network protocols allow network traffic metadata to be communicated with associated network traffic without any risk of data corruption to the network traffic. Additionally, virtual machine applications and modules of the network device can exchange network traffic metadata using extended non-standard network protocols without any knowledge of the data transfer topology for communicating network traffic between hosted virtual machines and the network device; this allows for flexibility in configuring virtual machine applications within a network device.

Figure 4:
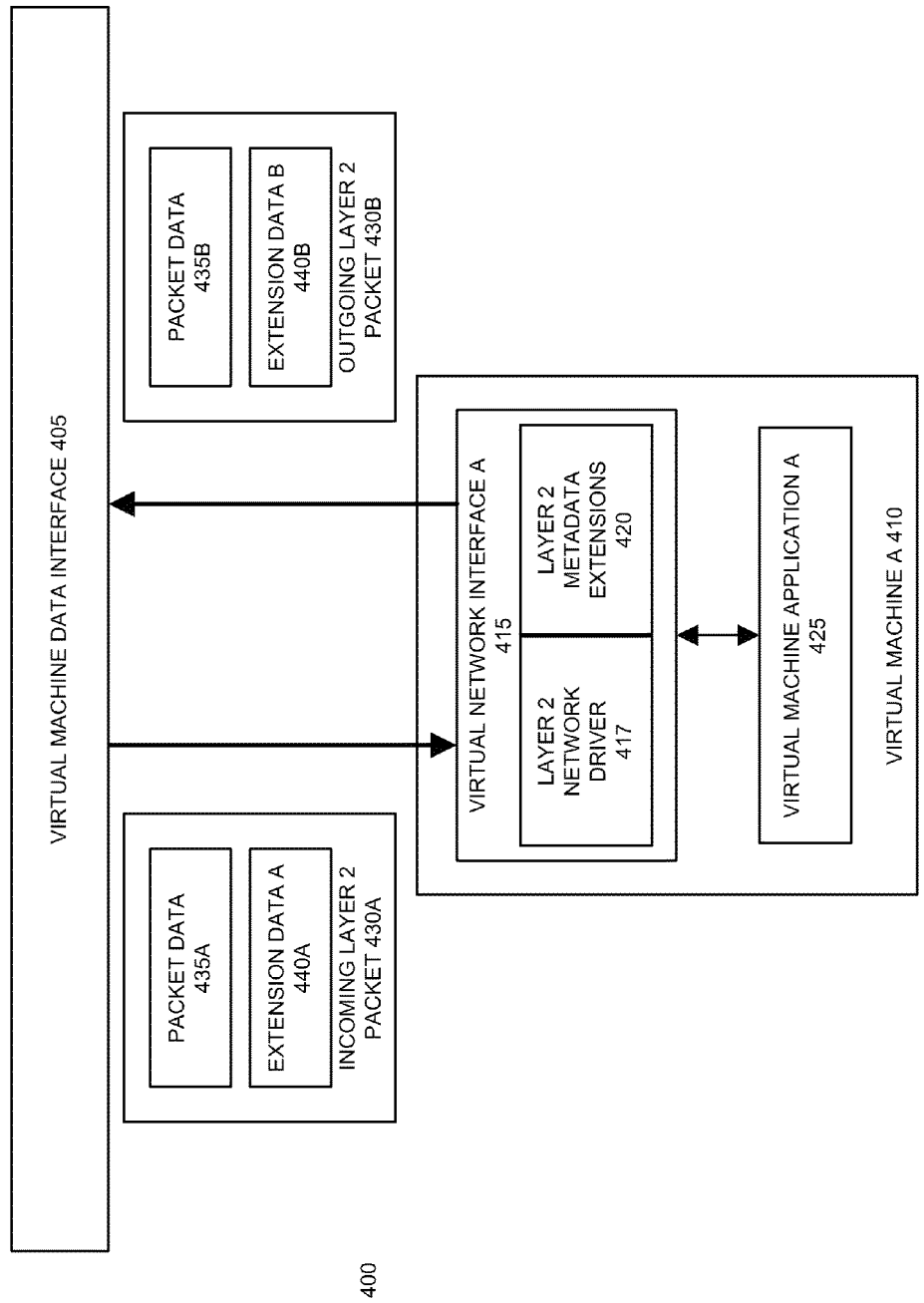
FIG. 4 illustrates an extended non-standard network protocol for inter-virtual machine application communication according to an embodiment of the invention.

FIG. 4 illustrates an example 400 of extended non-standard network protocol for inter-virtual machine application communication according to an embodiment of the invention. Example 400 includes a virtual machine data interface adapted to direct network traffic between modules of a network device and one or more hosted virtual machines 410, including hosted virtual machines 410. Virtual machine 410 includes a virtual network interface 415 adapted to send and receive network traffic from a side A network connection, a side B connection, modules of the network device and/or other hosted virtual machines according to a data transfer topology specified by hyperswitch interfaces included in the virtual machine data interface 405.

Virtual network interface 415 is adapted to communicate network traffic with at least one virtual machine application, such as virtual machine application 425. In an embodiment, virtual machine network 415 presents network traffic to the virtual machine application 425 using a network protocol, such as a layer 2 protocol like Ethernet. The virtual network interface 415 includes a layer 2 network driver 417 enabling communication of network traffic with the virtual machine application 425 using a layer 2 network protocol.

Additionally, virtual network interface 415 includes a layer 2 extension module 420. In an embodiment, the layer 2 extension module 420 is adapted to extract network traffic metadata associated with received packets or other units of network traffic. For example, if network packet 430a is received by the virtual network interface 415, the virtual network interface 415 and the layer 2 network driver 417 provide the packet data 435a to the virtual machine application 425. Additionally, an embodiment of the layer 2 extension module 420 provides extension data 440a including network traffic metadata to the virtual machine application.

In an embodiment, a virtual machine application 425 sends a query or command to the virtual network interface 415 to receive any extension data included in a received packet. If the received packet does not include any extension data, then this query or command will return an indicator of this state. Similarly, if the virtual machine application 425 does not request any extension data from the virtual network interface, then this extension data is ignored by the virtual network driver 415 and the layer 2 network driver 417. This allows virtual machine applications that are not adapted to use extension data to operate normally.

In a further embodiment, the virtual machine application 425 can output its own network traffic metadata to be included in an outgoing network packet. This additional network traffic metadata may be used by modules of the network device or other virtual machine applications executed on other hosted virtual machines. For example, upon receiving outbound network traffic data and outbound network traffic metadata from virtual machine application 425, the layer 2 network driver 417 converts the network traffic data into packet data 435b. The destination network address and other network packet configuration parameters are also provided to the layer 2 network driver 417 to create an initial network packet. Similarly, the layer 2 extension module 420 converts the network traffic metadata into extension data 440b. The initial network packet including packet data 435b and extension data 440b are then combined into outbound packet 430b, which is sent by virtual network interface 415 towards its destination.

In an embodiment, extension data including network traffic metadata is stored in packets 430a and 430b as additional data outside of the standard network packet data 435a and 435b. For example, extension data 440 may be included as additional data fields or attributes of network packets 430 outside of the packet data payload. Because network traffic data and its network traffic metadata are carried in the same network packet, network traffic metadata is automatically associated with its corresponding network traffic data. Additionally, because the extension data 440 is separate from the packet data 435, network traffic metadata cannot corrupt the network traffic data.

Figure 5A:
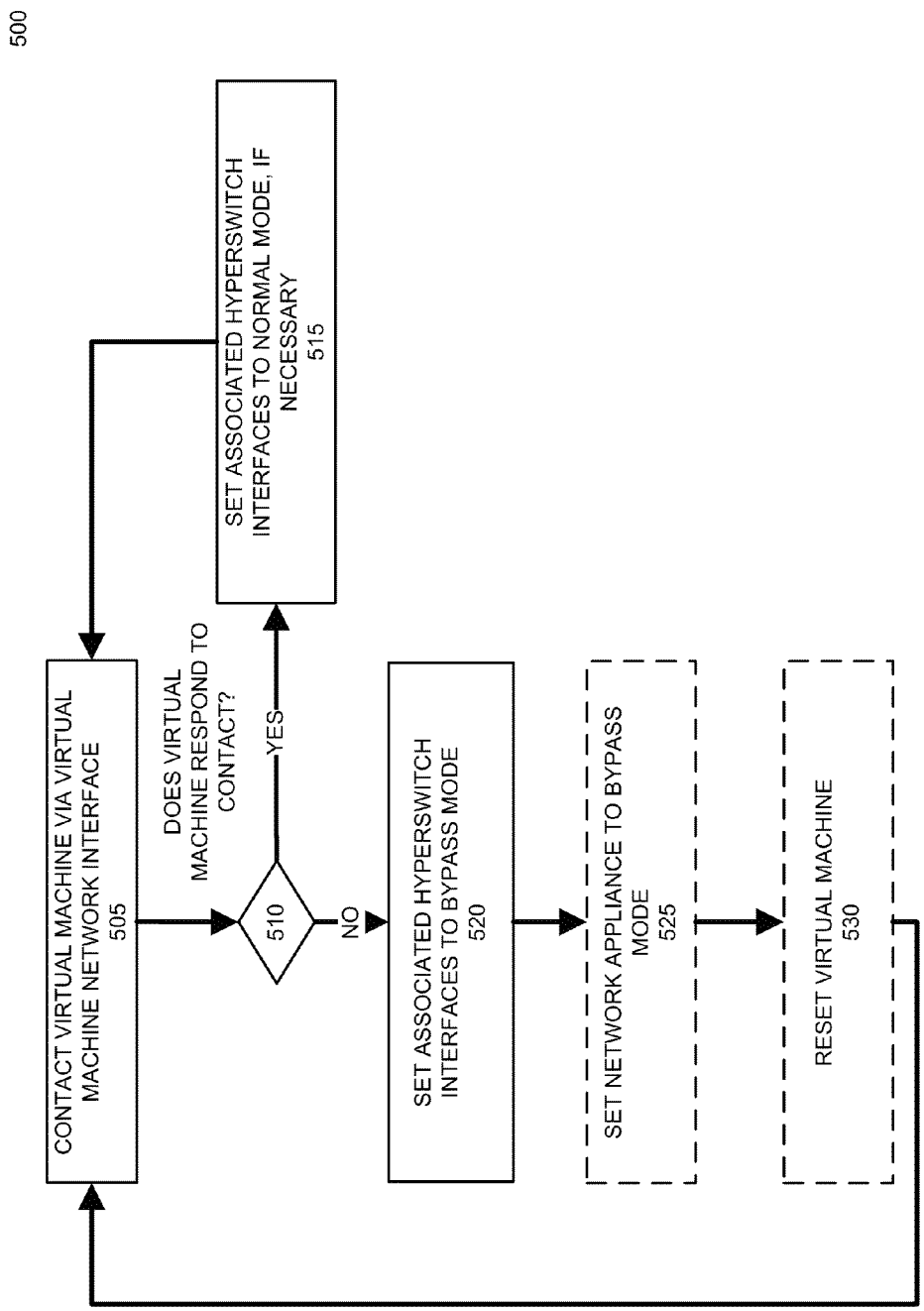
FIGS. 5A-5B illustrate watchdog systems for ensuring reliable virtual machine operation according to an embodiment of the invention.

FIG. 5A illustrates a watchdog method 500 used to ensure virtual machine application reliability according to an embodiment of the invention. In step 505, a module of the network device attempts to contact a hosted virtual machine via its virtual network interface. In an embodiment, step 505 generates a ping message, for example in the form of an ICMP echo request packet, addressed to the hosted virtual machine.

In decision block 510, method 500 determines if the hosted virtual machine response to the contact attempt. In an embodiment, decision block 510 waits for a duration of time (typically less than 50 ms) to give the virtual network interface of the hosted virtual machine adequate time to receive, process, and respond to the contact attempt. In an embodiment, the response of the hosted virtual machine can include a ping response message, such as ICMP echo response packet, addressed to a network address associated with the network device.

If the network device does receive a response to its contact request within the duration of time, then method 500 proceeds to step 515. Step 515 identifies the one or more hyperswitch interfaces associated with the hosted virtual machine. Step 515 then determines if any of these identified hyperswitch interfaces are operating in bypass mode, with their bypass connections activated to allow network traffic to pass through the hyperswitch interface without any rule processing. If any of the identified hyperswitch interfaces are operating in bypass mode, then step 515 deactivates their bypass connections, allowing these hyperswitches to process further network traffic according to their specified rules and rule criteria. In a further embodiment, step 515 determines if the network device is to bypass mode, allowing network traffic to pass through the network device without processing by any modules of the network device, such as a network traffic processing module, or any other hosted virtual machines and their virtual machine applications. If so, then an embodiment of step 515 may deactivate the network device's bypass mode, allowing the network device and its hosted virtual machines to process network traffic. Following step 515, method 500 returns to step 505 to determine if the virtual machine application function has been restored.

Conversely, if the network device does not receive a response to its contact request within the duration of time, then method 500 proceeds to step 520. Step 520 identifies the one or more hyperswitch interfaces associated with the hosted virtual machine. Step 520 then sets activates these hyperswitches' bypass connections, allowing network traffic to pass through the hyperswitch interface without any rule processing.

Optional step 525 may set the entire network device to operate in bypass mode. In some situations, a virtual machine application may perform a critical function, such as network security. In these situations, if the hosted virtual machine does not respond to a contact attempt, the all of the functions of network device should be shut down, rather than continue to operate without the critical function. Thus, optional step 525 may set the network device to bypass mode, allowing network traffic to pass through the network device without processing by any modules of the network device, such as a network traffic processing module, or any other hosted virtual machines and their virtual machine applications. In an embodiment, a user or network administrator configuration can specify whether step 525 should be performed upon the failure of a specific one of the hosted virtual machines, any combination of hosted virtual machines, or all of the hosted virtual machines. Additionally, a user or network administrator can specify the conditions under which the network device may exit its bypass mode (as described in step 515), such as upon restoration of operation of a specific one of the hosted virtual machines, any combination of hosted virtual machines, or all of the hosted virtual machines.

Optional step 530 attempts to reset or restart the hosted virtual machine. Upon restarting or resetting the hosted virtual machine, method 500 returns to step 505 to determine if the virtual machine application function has been restored.

Method 500 may be repeated at multiple time intervals to detect hosted virtual machine failures and possible restorations of functions. In an embodiment, method 500 may be applied to one or more the hosted virtual machines of a network device in series or in parallel.

Figure 5B:
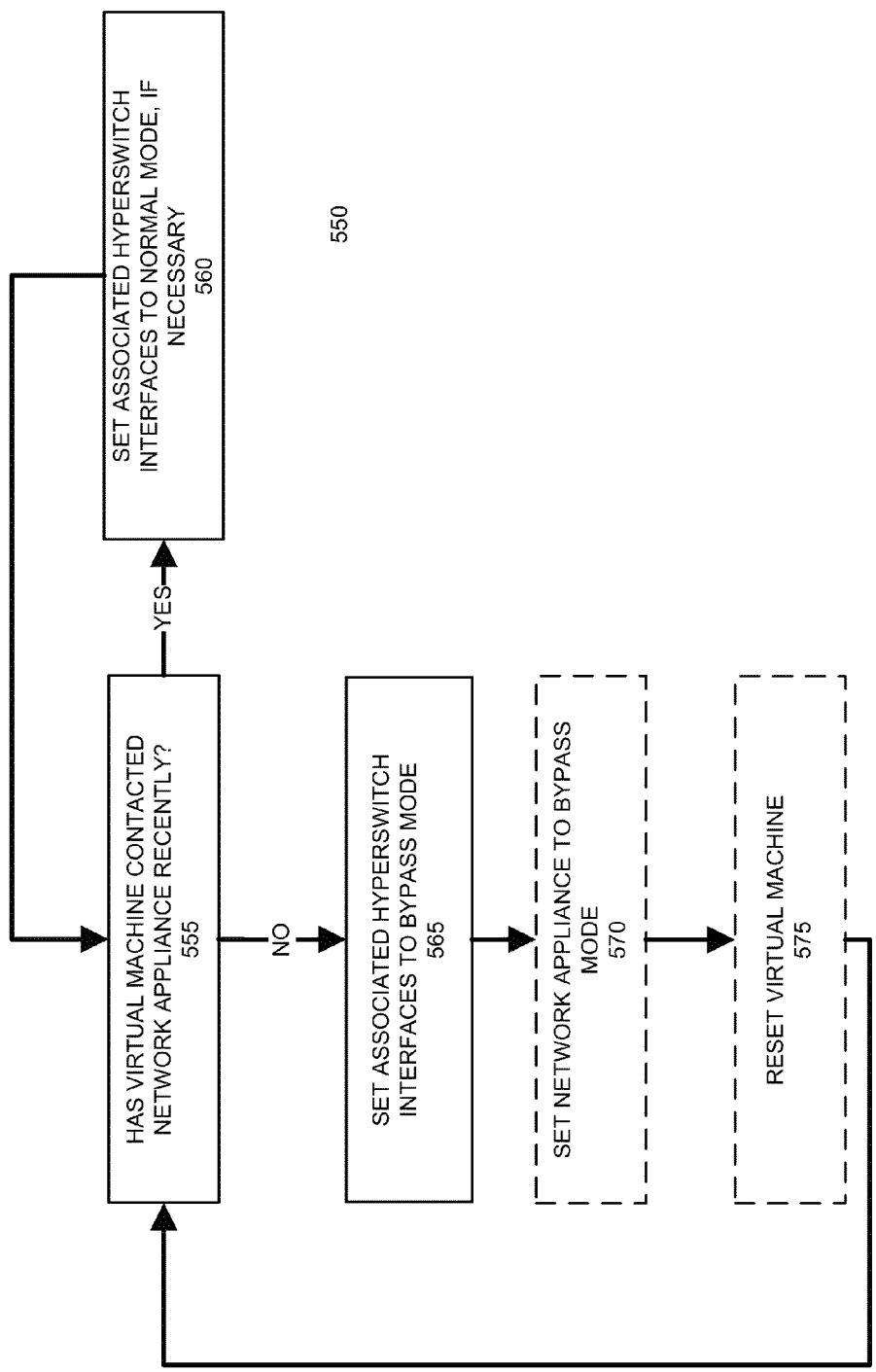

FIG. 5B illustrates a second watchdog method 550 used to ensure virtual machine application reliability according to an embodiment of the invention. In step 555, a module of the network device determines if one of the hosted virtual machines has contacted the module of the network device recently via its virtual network interface. In an embodiment, the module is adapted to receive a ping message from the hosted virtual machine, for example in the form of an ICMP echo request packet, addressed to the virtual network address associated with this network device module.

In an embodiment, step 555 waits for a predetermined duration of time from the last message received from the hosted virtual machine to receive the message. In an embodiment, a virtual machine application executed by the hosted virtual machine may be configured to periodically generate and send messages addressed to this module of the network device. In another embodiment, the virtual machine network interface and/or the hosted virtual machine itself may be configured to automatically generate and send periodic messages to this module of the network device. The period at which these messages is sent is configured to be less than or equal to the predetermined duration of time used by the module, such that the module always receives a message within the predetermined duration of time when the hosted virtual machine is operating normally.

If the network device does receive a message from the hosted virtual machine within the duration of time, then method 550 proceeds to step 560. Step 560 identifies the one or more hyperswitch interfaces associated with the hosted virtual machine. Step 560 then determines if any of these identified hyperswitch interfaces are operating in bypass mode, with their bypass connections activated to allow network traffic to pass through the hyperswitch interface without any rule processing. If any of the identified hyperswitch interfaces are operating in bypass mode, then step 560 deactivates their bypass connections, allowing these hyperswitches to process further network traffic according to their specified rules and rule criteria. In a further embodiment, step 560 determines if the network device is to bypass mode, allowing network traffic to pass through the network device without processing by any modules of the network device, such as a network traffic processing module, or any other hosted virtual machines and their virtual machine applications. If so, then an embodiment of step 560 may deactivate the network device's bypass mode, allowing the network device and its hosted virtual machines to process network traffic. Following step 560, method 550 returns to step 555 to await the next message from the hosted virtual machine.

Conversely, if the network device does not receive a message from the hosted virtual machine within the duration of time, then method 550 proceeds to step 565. Step 565 identifies the one or more hyperswitch interfaces associated with the hosted virtual machine. Step 565 then sets activates these hyperswitches' bypass connections, allowing network traffic to pass through the hyperswitch interface without any rule processing.

Optional step 570 may set the entire network device to operate in bypass mode. In some situations, a virtual machine application may perform a critical function, such as network security. In these situations, if the hosted virtual machine does not respond to a contact attempt, the all of the functions of network device should be shut down, rather than continue to operate without the critical function. Thus, optional step 570 may set the network device to bypass mode, allowing network traffic to pass through the network device without processing by any modules of the network device, such as a network traffic processing module, or any other hosted virtual machines and their virtual machine applications. In an embodiment, a user or network administrator configuration can specify whether step 570 should be performed upon the failure of a specific one of the hosted virtual machines, any combination of hosted virtual machines, or all of the hosted virtual machines. Additionally, a user or network administrator can specify the conditions under which the network device may exit its bypass mode (as described in step 560), such as upon restoration of operation of a specific one of the hosted virtual machines, any combination of hosted virtual machines, or all of the hosted virtual machines.

Optional step 575 attempts to reset or restart the hosted virtual machine. Upon restarting or resetting the hosted virtual machine, method 550 returns to step 555 to await the receipt of a message from the hosted virtual machine, indicating that the virtual machine application function has been restored.

Method 550 may be repeated at multiple time intervals to detect hosted virtual machine failures and possible restorations of functions. In an embodiment, method 550 may be applied to one or more the hosted virtual machines of a network device in series or in parallel.

Figure 6:
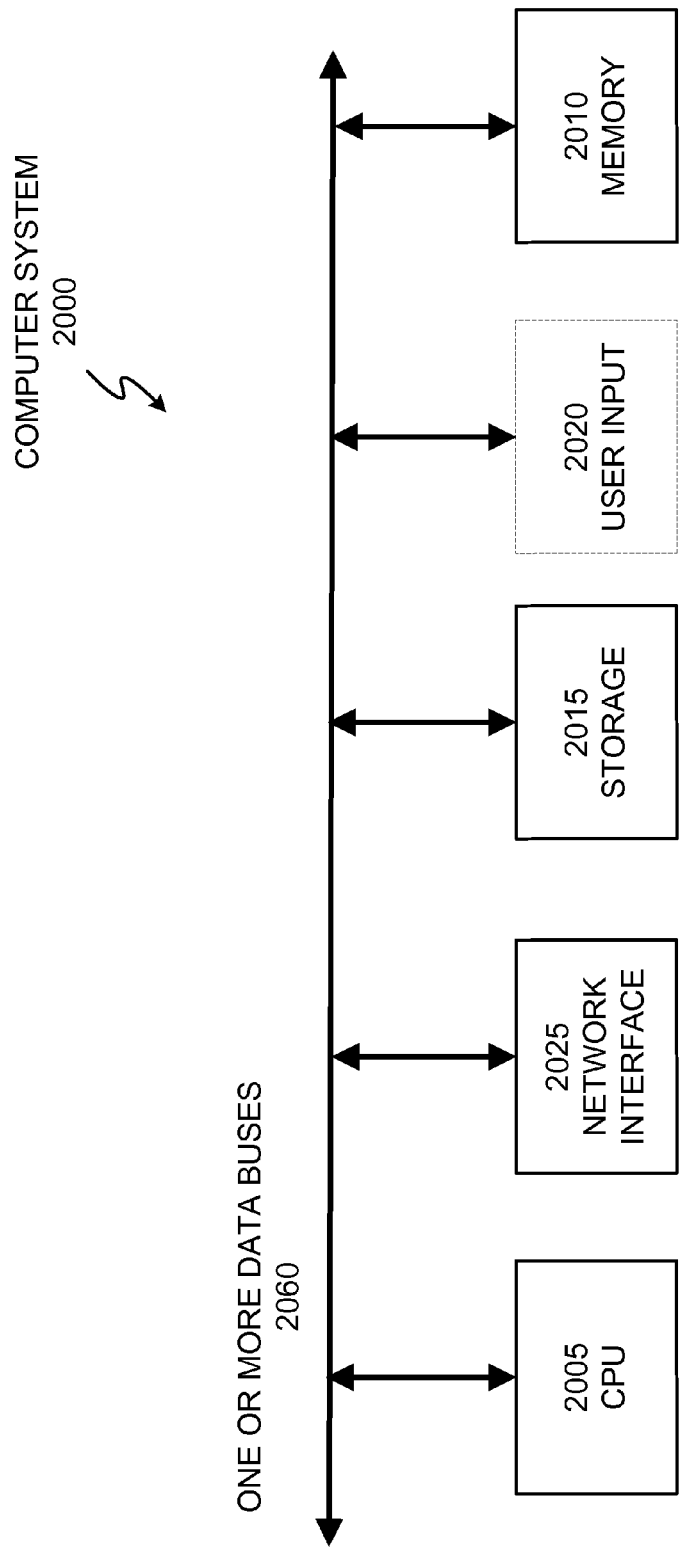
FIG. 6 illustrates an example computer system capable of implementing a network device including hosted virtual machines and associated interfaces according to an embodiment of the invention.

FIG. 6 illustrates an example computer system capable of implementing a network device including hosted virtual machines and associated interfaces according to an embodiment of the invention. FIG. 6 is a block diagram of a computer system 2000, such as a personal computer or other digital device, suitable for practicing an embodiment of the invention. Embodiments of computer system 2000 may include dedicated networking devices, such as wireless access points, network switches, hubs, routers, hardware firewalls, network traffic optimizers and accelerators, network attached storage devices, storage array network interfaces, and combinations thereof.

Computer system 2000 includes a central processing unit (CPU) 2005 for running software applications and optionally an operating system. CPU 2005 may be comprised of one or more processing cores. Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, HD-DVD, or other magnetic, optical, or solid state storage devices. In a further embodiment, CPU 2005 may execute virtual machine software applications to create one or more virtual processors capable of executing additional software applications and optional additional operating systems. Virtual machine applications can include interpreters, recompilers, and just-in-time compilers to assist in executing software applications within virtual machines. Additionally, one or more CPUs 2005 or associated processing cores can include virtualization specific hardware, such as additional register sets, memory address manipulation hardware, additional virtualization-specific processor instructions, and virtual machine state maintenance and migration hardware.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and computer system 2000 may present a user interface to a user over a network, for example using a web page or network management protocol and network management software applications.

Computer system 2000 includes one or more network interfaces 2025 that allow computer system 2000 to communicate with other computer systems via an electronic communications network, and may include wired or wireless communication over local area networks and wide area networks such as the Internet. Computer system 2000 may support a variety of networking protocols at one or more levels of abstraction. For example, computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 2000 may also include one or more wired networking interfaces, such as one or more Ethernet connections to communicate with other networking devices via local or wide-area networks.

The components of computer system 2000, including CPU 2005, memory 2010, data storage 2015, user input devices 2020, and network interface 2025 are connected via one or more data buses 2060. Additionally, some or all of the components of computer system 2000, including CPU 2005, memory 2010, data storage 2015, user input devices 2020, and network interface 2025 may be integrated together into one or more integrated circuits or integrated circuit packages. Furthermore, some or all of the components of computer system 2000 may be implemented as application specific integrated circuits (ASICS) and/or programmable logic.

Further embodiments can be envisioned to one of ordinary skill in the art after reading the attached documents. For example, embodiments of the invention can be used with any number of network connections and may be added to any type of network device, client or server computer, or other computing device in addition to the computer illustrated above. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A network device adapted to process network traffic, the network device comprising:

a memory;

a first network connection adapted to communicate first network traffic, wherein the first network connection is connected with a first network;

a second network connection adapted to communicate second network traffic, wherein the second network connection is connected with a second network;

a network traffic processing module connected with the first network connection and the second network connection;

a plurality of hosted virtual machines each adapted to execute at least one virtual machine application;

a virtual machine data interface connected with the plurality of hosted virtual machines and the network traffic processing module, wherein the virtual machine data interface is adapted to direct a first portion of the first network traffic and a first portion of the second network traffic according to network traffic rule criteria and network traffic rules;

a first network traffic tap adapted to direct at least the first portion of the first network traffic between the first network connection and the virtual machine data interface; and a second network traffic tap adapted to direct at least a first portion of the second network traffic between the second network connection and the virtual machine data interface; and at least one intra-module network traffic tap adapted to direct network traffic metadata from the network traffic processing module to the virtual machine data interface, wherein the network traffic metadata includes additional information describing application associated with the network traffic, and wherein the network traffic metadata is communicated to one or more virtual machine applications using an extended non-standard protocol that provides functionality of application programming interface;

wherein the virtual machine data interface is adapted to direct the first portion of the first network traffic and the first portion of the second network traffic between the first and second network traffic taps and the plurality of hosted virtual machines;

wherein the virtual machine data interface is adapted to direct the network traffic metadata between the intra-module network traffic tap and the plurality of hosted virtual machines.

2. The network device of claim 1, wherein the first portion of the processed network traffic includes network traffic generated by the plurality of hosted virtual machines.

3. The network device of claim 1, wherein:

the plurality of hosted virtual machines includes a first hosted virtual machine and a first virtual machine application adapted to perform a sequence of operations on processed network traffic, wherein the processed network traffic includes a second portion of the first network traffic, a second portion of the second network traffic, or both the second portion of the first network traffic and the second portion of the second network traffic.

4. The network device of claim 3, comprising:

at least one intra-module network traffic tap adapted to direct at least a first portion of the processed network traffic within the sequence of operations between the first hosted virtual machine and the virtual machine data interface;

wherein the virtual machine data interface is adapted to direct the first portion of the processed network traffic between the plurality of hosted virtual machines and the first and second network traffic taps.

5. The network device of claim 1, wherein:

the plurality of hosted virtual machines includes a first hosted virtual machine, wherein the first hosted virtual machine includes a first virtual network interface adapted to communicate the first portions of the first and second network traffic with a first virtual machine application, wherein the first portions of the first and second network traffic are received from the virtual machine data interface.

6. The network device of claim 1, wherein the first network traffic includes network traffic received from a first network via the first network connection.

7. The network device of claim 1, wherein the first network traffic includes network traffic generated by the plurality of hosted virtual machines and directed towards a first network via the first network connection.

8. The network device of claim 1, wherein the network traffic rules include a redirect rule adapted to direct at least one of the first portions of the first and second network traffic to one of the plurality of hosted virtual machines.

9. The network device of claim 1, wherein the network traffic rules include a copy rule adapted to direct a copy of the first portion of the first network traffic, the first portion of the second network traffic, or both first portion of the first network traffic and the first portion of the second network traffic to one of the plurality of hosted virtual machines.

10. The network device of claim 1, wherein the network traffic rules include a drop rule adapted to discard one of the first portions of the first and second network traffic.

11. The network device of claim 1, comprising:

a management module adapted to configure the first and second network traffic taps and the virtual machine data interface.

12. The network device of claim 1, wherein the first network connection and the second network connection are connected with the first network.

13. The network device of claim 1, wherein the first network connection is connected with the first network and the second network connection is connected with the second network.

14. The network device of claim 1, wherein the network traffic rules include a pass rule adapted to bypass at least one of the first portions of the first and second network traffic around one of the plurality of hosted virtual machines.

* * * * *